United States Patent [19]

Kanou et al.

[11] Patent Number: 4,713,411
[45] Date of Patent: Dec. 15, 1987

[54] PIGMENT COMPOSITION AND PREPARATION PROCESS THEREOF

[75] Inventors: Kazuo Kanou, Satte; Takamitu Shinoda, Kashiwa; Yukio Kanbara, Warabi, all of Japan

[73] Assignee: Dainichiseika Color & Chemicals Mfg. Co., Ltd., Tokyo, Japan

[21] Appl. No.: 869,325

[22] Filed: Jun. 2, 1986

[51] Int. Cl.$^4$ ................................................. C08J 3/04
[52] U.S. Cl. ................................ 524/560; 106/288 Q; 106/309; 524/562
[58] Field of Search ........................ 106/288 Q, 309; 524/560, 562

[56] References Cited

U.S. PATENT DOCUMENTS

| | | | |
|---|---|---|---|
| 4,049,610 | 9/1977 | Bunge et al. | 106/288 Q |
| 4,089,699 | 5/1978 | Blackburn et al. | 106/288 Q |
| 4,107,126 | 8/1978 | Burke, Jr. | 524/562 |
| 4,317,682 | 3/1982 | Katsura et al. | 106/288 Q |
| 4,521,494 | 6/1985 | Mani | 524/560 |
| 4,613,648 | 9/1986 | Usala | 524/560 |
| 4,639,394 | 1/1987 | Das et al. | 524/562 |
| 4,663,384 | 5/1987 | Penzel et al. | 524/560 |

Primary Examiner—Paul Lieberman
Assistant Examiner—Willie J. Thompson
Attorney, Agent, or Firm—Oblon, Fisher, Spivak, McClelland & Maier

[57] ABSTRACT

A pigment composition is composed of an intimate mixture of an organic pigment and a polymer. The content of the organic pigment is 75-95 wt. % based on the whole pigment composition. Monomers which form the polymer include 0-40 wt. % of styrene, 20-70 wt. % of a methacrylic ester and 20-50 wt. % of methacrylic acid. The total proportion of styrene, the methacrylic ester and methacrylic acid is at least 85 wt. % of the entire monomers. The pigment composition is prepared by mixing the organic pigment with an aqueous alkaline solution, which contains the polymer and an alkali metal salt, alkali metal hydroxide, lower amine or ammonium, to form an aqueous dispersion. The organic pigment and polymer are then subjected to coprecipitation, preferably, by lowering the pH of the aqueous dispersion beyond 7.0.

16 Claims, No Drawings

PIGMENT COMPOSITION AND PREPARATION PROCESS THEREOF

BACKGROUND OF THE INVENTION (1) Field of the Invention:

This invention relates to an easily water-dispersible pigment composition, and more specifically to a pigment composition dispersible readily by its addition to alkaline water and subsequent slight mixing and hence useful, especially, for the preparation of water-base inks and water-base paints.

(2) Description of the Prior Art:

A number of proposals have heretofore been made on pigment compositions each of which can be readily dispersed by adding same in an aqueous medium or vehicle and then merely mixing the resultant aqueous mixture. These readily-dispersible prior-art pigment compositions are generally mixtures of pigments and surfactants kneaded together or mixtures of pigments and water-soluble polymers kneaded together.

Readily-dispersible conventional pigment compositions of the above-mentioned sort employ the surfactants or water-soluble polymers in relatively large amounts relative to their corresponding pigments so that they can be readily dispersed in aqueous media or vehicles. Where the pigment is an organic pigment, a surfactant or water-soluble polymer is used in an amount accounting for at least 40 wt. % of a pigment composition to be prepared. When such a readily-dispersible pigment composition is added and dispersed in an aqueous medium or vehicle for use in the preparation of a water-base ink or water-base paint, one or more of various polymers are also used as binders in addition to the pigment composition. These polymers are selected suitably depending on what use to be made of the resulting water-base ink or paint. Since surfactants or water-soluble polymers are contained in high proportions in their corresponding pigment compositions, these surfactants or water-soluble polymers amount to significant proportions in dispersions and affect deleteriously on the properties of polymers incorporated as binders, resulting in development of various problems. These problems can be solved by lowering the proportion of a surfactant or water-soluble polymer to be employed in a pigment composition. Use of such a surfactant or water-soluble polymer in any amounts below 40 wt. % will however lead to significant loss of the high dispersibility of the pigment in the pigment composition so that sufficient dispersion will no longer be attained by its simple mixing in an aqueous medium or vehicle.

Under the circumstances, there is thus a strong demand for an easily-dispersible pigment composition which contains a dispersant in such a small amount that the properties of a resin added as a binder in an aqueous medium or vehicle are not deleteriously affected.

SUMMARY OF THE INVENTION

The present inventors have carried out an extensive investigation with a view toward meeting the above-mentioned demand. As a result, it has been found that when a specific water-soluble polymer is used as a dispersant for an organic pigment and the polymer and organic pigment are converted into a pigment composition by a special preparation process, the resultant pigment composition can fully meet the above-mentioned demand, leading to completion of this invention.

In one aspect of this invention, there is thus provided a pigment composition composed of an intimate mixture of an organic pigment and a polymer, characterized in that the content of the organic pigment is 75–95 wt. % based on the whole pigment composition, monomers which form the polymer include 0–40 wt. % of styrene, 20–70 wt. % of a methacrylic ester and 20–50 wt. % of methacrylic acid, and the total proportion of styrene, the methacrylic ester and methacrylic acid is at least 85 wt. % of the entire monomers.

In another aspect of this invention, there is also provided a process for preparing a pigment composition by mixing 75–95 wt. %, based on the whole pigment composition, of an organic pigment with an aqueous solution containing 25–5 wt. %, based on the whole pigment composition, of a polymer to form an aqueous dispersion and then subjecting the organic pigment and polymer to coprecipitation, characterized in that monomers which form the polymer include 0–40 wt. % of styrene, 20–70 wt. % of a methacrylic ester and 20–50 wt. % of methacrylic acid, and the total proportion of styrene, the methacrylic ester and methacrylic acid is at least 85 wt. % of the entire monomers, and the aqueous solution is an aqueous alkaline solution of an alkali metal salt, an alkali metal hydroxide, a lower amine or ammonium.

The pigment composition of this invention can be easily dispersed as fine particles in an aqueous alkaline medium or vehicle by simply adding and mixing the composition with the medium or vehicle. In conventional preparation of water-base paints or inks, it was necessary to carry out a dispersing step for a long period of time under very strict conditions. Use of the pigment composition of this invention permits the provision of a sufficient aqueous dispersion of the pigment composition only by simple mixing and is hence very economical.

Moreover, the pigment composition contains the polymer as a dispersant in an amount far smaller than the amounts of dispersants in conventional pigment compositions. Corollary to this, the polymer gives less adverse effects to the properties of a binder resin which is used upon preparation of a water-base ink or paint. The pigment composition of this invention is therefore useful as a colorant for water-base inks and paints which are employed for various applications.

The above and other objects, features and advantages of this invention will become apparent from the following description and the appended claims.

DETAILED DESCRIPTION OF THE INVENTION AND PREFERRED EMBODIMENTS

The pigment useful in the practice of the present invention is an organic pigment. It is one of features of the present invention and an important advantage of this invention that such an organic pigment is used in an amount ranging from 75 wt. % to 95 wt. % based on the whole pigment composition. Among conventional pigment compositions which are dispersible readily in aqueous media or vehicles and contain organic pigments as their pigments, none have been known to have such a high pigment content.

The polymer employed as a principal feature in the present invention is a water-soluble acrylic polymer. Although there have been known some reports dealing with use of water-soluble acrylic polymers as dispersants for organic pigments, the objects of the present invention were not fully attained with such conventional water-soluble acrylic polymers. The water-soluble acrylic polymer useful in the practice of this invention is characterized in that it has specific monomer proportions. Owing principally to these features, the objects of this invention have now been achieved.

The water-soluble acrylic polymer to be employed in the present invention features that styrene, a methacrylic ester and methacrylic acid are polymerized in proportions of 0-40 wt. %, 20-70 wt. % and 20-50 wt. % respectively and when one or more additional monomers are employed besides the above-described monomers, the sum of the first-mentioned three types of monomers amounts to at least 85 wt. % of the entire monomers. Further, the monomer proportions most preferable in the present invention include 10-30 wt. % of styrene, 10-55 wt. % of a methacrylic ester (with the methyl ester being particularly preferred), 10-30 wt. % of the methacrylic acid ester of an aliphatic alcohol having at least 6 carbon atoms, and 25-50 wt. % of methacrylic acid. The sum of these monomers amounts to at least 90 wt. % of the entire monomers.

The above-described dispersant useful in the practice of this invention can be obtained by any polymerization process such as a usual mixed polymerization process, e.g., solution polymerization, suspension polymerization, emulsion polymerization, or the like. The polymeric dispersant of this invention, which is obtained in the above-described manner, may be of any polymerization degree. In view of the objects of this invention, the polymeric dispersant may preferably have a molecular weight in a range of 5,000-100,000 and a glass transition point of 100° C. or higher.

In the present invention, the pigment to be dispersed by the above-described polymer is an organic pigment. Any conventionally-known organic pigments may be successfully used in the present invention, including azo pigments, phthalocyanine pigments, anthraquinone pigments, perylene/perinone pigments, quinacridone pigments and dioxazine pigments by way of example. In the pigment composition of this invention, the organic pigment is used in such a amount that it accounts for 75-95 wt. % of the whole pigment composition with 80-90 wt. % being most preferred. It is another advantage of this invention that the pigment is used in such a high proportion. Owing to the use of a specific polymeric dispersant such as that mentioned above, good dispersibility is still assured even at such a high pigment concentration. Unlike the present invention, conventional techniques were not able to impart sufficient dispersibility to pigments in aqueous media or vehicles when the pigments were used in such high proportions as described above.

The essential components of the pigment composition of this invention have been described above. The pigment composition of this invention is prepared in the following manner. Namely, the above-described specific polymeric dispersant is dissolved in an aqueous alkaline solution of a alkali metal hydroxide, alkali metal carbonate, ammonia, lower amine or the like, preferably, to a concentration of about 3-10 wt. %. A desired pigment is then added in the thus-prepared solution, followed by dispersion of the pigment by means of a desirable disperser, for example, ball mill, sand mill, speed line mill or the like. Thereafter, an organic or inorganic acid is added to the resultant dispersion to lower the pH of the dispersion beyond 7.0, whereby the water-soluble acrylic polymer as a binder is allowed to deposit while entrapping the dispersed pigment therein, in other words, to undergo coprecipitation with the dispersed pigment. Any conventionally-known acid may be used as the acid employed for the above-described pH adjustment. It is an organic acid such as acetic acid that is most preferable for it. It is suitable to effect the pH adjustment to such a degree that the pH of the dispersion falls within a range of about 3 to 4.5. The deposited pigment composition is separated from the aqueous medium by filtration. The pigment composition of this invention may of course be in such a wet form as that obtained above. If needed, it may be dried at a temperature of about 90°-120° C. for about 4-24 hours to obtain the pigment composition of this invention in a powdery or particulate form.

The present invention will hereinafter be described more specifically by the following Examples, in which all designations of "part" or "parts" and "%" mean part or parts by weight and wt. %. It should however be borne in mind that the present invention is not necessarily limited to or by the following Examples.

EXAMPLE 1

Using 2.5 parts of azobisisobutyronitrile (hereinafter abbreviated as "AIBN" for the sake of brevity) as a polymerization initiator, 20 parts of styrene, 25 parts of methyl methacrylate, 20 parts of 2-ethylhexyl methacrylate and 35 parts of methacrylic acid were polymerized at 76° C.-80° C. for 5 hours in 150 parts of ethanol as a polymerization solvent. The polymerization mixture was then cooled to 50° C., followed by addition of 24 parts of a 28% solution of ammonia in water and 56.8 parts of water to obtain an aqueous dispersant solution useful in the practice of this invention.

Then, 34 parts of C.I. Pigment Blue 15-3, 20 parts of the above-obtained aqueous dispersant solution and 46 parts of water were subjected to a dispersion treatment with four passes through a horizontal- and continuous-type glass-bead disperser.

Five hundred parts of water were added to and mixed with one hundred parts of the thus-obtained dispersion of the blue pigment. Fifty parts of a 10% solution of acetic acid in water were thereafter added with stirring to the diluted dispersion, so that a pigment composition of this invention was caused to deposit. The acidified mixture was then heated to 70° C., followed by its filtration to collect the deposit. The deposit was washed with hot water of 70° C.-80° C. until the pH of the washing reached 6.5 or higher.

The thus-washed solid matter was dried at 120° C. for 24 hours and then ground to obtain the pigment composition of this invention in its final form. Upon mixing the resultant pigment composition with the following composition for 30 minutes in a dissolver, it was readily dispersed in water to provide an aqueous fine pigment dispersion having stable and excellent quality.

| | Parts |
| --- | --- |
| Water | 59 |
| Polyoxyethylene octylphenyl ether (HLB: 13.1) | 1 |
| 28% aqueous ammonia | 2.5 |
| Above-obtained pigment composition of this invention | 37.5 |

The pigment dispersion was useful in coloring an water-base emulsion paint as described below.
Preparation of titanium white dispersion:

| | Parts |
|---|---|
| Rutile-type titanium white | 50 |
| Water | 44.8 |
| "Demol EP" (trade name; product of Kao-Atlas Co., Ltd., now, Kao Corporation) | 2 |
| 10% Aq. hydroxyethylcellulose soln. | 3 |
| Defoaming agent | 0.2 |

The above components were dispersed for 10 hours in a porcelain-made ball mill.

| | Parts |
|---|---|
| Aqueous titanium white obtained above | 40 |
| Acrylic emulsion for water-base paints (solid content: 46%) | 57 |
| "Texanol" (trade mark; product of Eastman Kodak Company) | 3 |
| Blue pigment dispersion obtained above | 2 |

The above components were proportioned and mixed to obtain a water-base paint. Panels painted with the water-base paint had a vivid light blue color of excellent gloss.

EXAMPLE 2

Using 2.5 parts of AIBN as a polymerization initiator, 10 parts of styrene, 55 parts of methyl methacrylate, 10 parts of lauryl methacrylate and 25 parts of methacrylic acid were polymerized at 81° C.–85° C. for 5 hours in 100 parts of isopropyl alcohol as a polymerization solvent. The polymerization mixture was then cooled to 50° C., followed by addition of 15 parts of a 28% solution of ammonia in water and 35 parts of water to obtain an aqueous dispersant solution useful in the practice of this invention.

Then, 36 parts of C.I. Pigment Yellow 14, 10 parts of the above-obtained aqueous dispersant solution and 54 parts of water were subjected to a dispersion treatment for 24 hours in a ball mill. Three parts of acetic acid were then added to 500 parts of hot water of 70° C., followed by an addition with stirring of 100 parts of the above-obtained dispersion, so that a pigment composition of this invention was caused to deposit. Filtration, hot-water washing, drying and grinding were thereafter carried out in the same manner as in Example 1, thereby obtaining the pigment composition of this invention in its final form.

To a liquid mixture of 50 parts of water and 10 parts of isopropyl alcohol, 38 parts of the above-obtained pigment composition were added. After thorough de-aeration, 2 parts of diethanolamine were added and the resultant mixture was stirred for about 30 minutes to obtain a dispersion. In accordance with the following composition, this dispersion was successfully employed for the preparation of a water-base flexographic ink.

| | Parts |
|---|---|
| Yellow pigment dispersion obtained above | 44 |
| 35% Aq. soln. of "Johncryl 678" (trade name; product of Johnson Company Ltd.) prepared in a manner to be described subsequently | 39 |
| Water | 11 |
| "Johnwax 26" (trade name; product of Johnson Company Ltd.) | 5 |
| Defoaming agent | 0.2 |

Printed matter making use of the above-described water-base flexographic ink were good, especially, in gloss.

Incidentally, the 35% aq. soln. of "Johncryl 678" was prepared in accordance with the following composition.

| | Parts |
|---|---|
| "Johncryl 678" | 35 |
| 28% Aqueous ammonia | 7.5 |
| Ethylene glycol | 1.5 |
| Isopropyl alcohol | 3 |
| Water | 53 |
| Total | 100 |

EXAMPLE 3

After thoroughly stirring 112.5 parts of a 32%-water paste of C.I. Pigment Red 48-2 and 13.3 parts of the aqueous dispersant solution of Example 1 in a dissolver, the resultant mixture was subjected to a dispersion treatment in a sand mill. Five hundred parts of water were added to 125.8 parts of the above-obtained dispersion of the red pigment, and the resultant mixture was heated to 70° C. With stirring, 30 parts of a 10% aqueous solution of acetic acid were added to cause a pigment composition of this invention to deposit. Filtration, hot-water washing, drying and grinding were thereafter carried out in the same manner as in Example 1, thereby obtaining the pigment composition of this invention in its final form.

| | Parts |
|---|---|
| Water | 58.8 |
| Polyoxyethylene octylphenyl ether (HLB: 13.1) | 1 |
| Aqueous ammonia | 2.5 |
| Defoaming agent | 0.2 |
| The above-obtained pigment composition of this invention | 37.5 |

The above components were next stirred for about 30 minutes in a dissolver to obtain a dispersion.

In accordance with the following composition, this dispersion was successfully employed for the preparation of a water-base flexographic ink.

| | Parts |
|---|---|
| Red pigment dispersion obtained above | 44 |
| Acrylic-styrene base emulsion (solid content: 43%) | 56 |

The above flexographic ink was superb, particularly, in gloss and transparency. It was able to provide attracting wrapping and packaging materials even when employed for transparent film-laminated paper, to say nothing of ordinary paper.

EXAMPLE 4

Using 2 parts of AIBN as a polymerization initiator, 20 parts of styrene, 20 parts of methyl methacrylate, 20 parts of 2-ethylhexyl methacrylate, 10 parts of N,N-dimethylaminoethyl methacrylate and 30 parts of methacrylic acid were polymerized at 125° C.–130° C. for 4 hours in 100 parts of ethylene glycol monoethyl ether as a polymerization solvent. The polymerization mixture was then cooled to 80° C., followed by addition of 36 parts of diethanolamine and 14 parts of water. The resultant mixture was stirred to obtain an aqueous dispersant solution useful in the practice of this invention.

|  | Parts |
| --- | --- |
| 50% Paste of C.I. Pigment Green 7 in ether glycol | 64 |
| Aqueous dispersant solution obtained above | 20 |
| Water | 16 |

The above components were proportioned and mixed. The resultant mixture was given two passes through the same horizontal-type disperser as that employed in Example 1.

Six parts of acetic acid were then added to 500 parts of hot water of 70° C., followed by an addition with stirring of the above-obtained dispersion to cause a pigment composition of this invention to deposit. Filtration, hot-water washing, drying and grinding were thereafter carried out in the same manner as in Example 1, thereby obtaining the pigment composition of this invention in its final form.

The pigment composition of this invention was readily dispersed in the following manner.

|  | Parts |
| --- | --- |
| Water | 45 |
| Isopropyl alcohol | 20 |
| The above-obtained pigment composition of this invention | 32 |
| Diethanolamine | 3 |

By stirring the above mixture for 30 minutes in a dissolver, a dispersion was obtained. In accordance with the following composition, this dispersion was successfully employed for the preparation of a water-base flexographic ink.

|  | Parts |
| --- | --- |
| Above-obtained dispersion | 59 |
| Water | 9 |
| 35% Aq. "Johncryl 678" solution prepared in Example 2 | 32 |

The water-base flexographic ink obtained by mixing the above components had extremely good gloss and transparency. Attracting printed matter were obtained upon printing of paper laminated with aluminum foil or aluminized paper with the flexographic ink.

EXAMPLE 5

Using 2.5 parts of AIBN as a polymerization initiator, 30 parts of styrene, 10 parts of methyl methacrylate, 10 parts of lauryl methacrylate and 50 parts of methacrylic acid were polymerized at 125° C.–130° C. for 4 hours in 100 parts of ethylene glycol monoethyl ether as a polymerization solvent. The polymerization mixture was then cooled to 80° C., followed by addition of 60 parts of diethanolamine and 73 parts of water to obtain an aqueous dispersant solution useful in the practice of this invention.

|  | Parts |
| --- | --- |
| C.I. Pigment Blue 15-3 | 34 |
| Aqueous dispersant solution obtained above | 20 |
| Water | 46 |

The above components were proportioned and mixed, followed by a dispersion treatment through the same horizontal-type disperser as that employed in Example 1.

Five hundred parts of water were added to 100 parts of the dispersion. The resultant mixture was heated to 70° C., followed by an addition of 75 parts of a 10% aqueous solution of acetic acid to cause a pigment composition of this invention to deposit. Filtration, hot-water washing, drying and grinding were thereafter carried out in the same manner as in Example 1, thereby obtaining the pigment composition of this invention in its final form.

The pigment composition was useful in coloring a powdered water-base paint as described below.

|  | Parts |
| --- | --- |
| Precipitated barium sulfate | 50 |
| Pigment composition obtained above | 1 |
| Polyvinyl alcohol of low polymerization degree | 5 |
| Polyoxyethylene octylphenyl ether | 0.2 |
| Diethanolamine | 0.2 |

The above components were mixed intimately. The mixing is preferably effected by a high-speed mixer such as Henschel mixer. Alternatively, a grinder may be used subsequent to mild mixing.

A water-base paint was obtained by adding 50 parts of water to 50 parts of the above composition and then mixing the resultant mixture with simple mixing means such as a mixing rod or the like. Since the waterproofness of this paint is not sufficient, it is desirable to use a crosslinking agent or a powdered readily-dispersible resin emulsion depending on what use to be made.

REFERENTIAL EXAMPLE

Using 3.5 parts of AIBN as a polymerization initiator, 20 parts of styrene, 25 parts of methyl methacrylate, 20 parts of butyl acrylate and 35 parts of methacrylic acid were polymerized at 81° C.–85° C. for 5 hours in 100 parts of isopropyl alcohol as a polymerization solvent. The polymerization mixture was added with 21 parts of 28% aqueous ammonia and 29 parts of water to obtain an aqueous dispersant solution for the sake of comparison.

|  | Parts |
| --- | --- |
| C.I. Pigment Blue 15-3 | 34 |
| Aqueous dispersant solution obtained above | 15 |
| Water | 51 |

The above components were subjected to a dispersion treatment through the same horizontal-type disperser as that employed in Example 1. Five hundred parts of water were added to 100 parts of the above-obtained dispersion of the blue pigment. While stirring the resultant mixture, 50 parts of a 10% aqueous solution of acetic acid were added to cause a referential pigment composition to deposit. The deposit was collected by filtration, washed with water and then dried at 120° C. for 24 hours, followed further by its grinding to obtain the referential pigment composition in its final form.

| | Parts |
|---|---|
| Water | 59 |
| Polyoxyethylene octylphenyl ether (HLB: 13.1) | 1 |
| Aqueous ammonia | 2.5 |
| Pigment composition obtained above | 37.5 |

The above components were stirred for 30 minutes in a dissolver but a great deal of insoluble matter was observed.

Having now fully described the invention, it will be apparent for one of ordinary skill in the art that many changes and modifications can be made thereto without departing from the spirit or scope of the invention as set forth therein.

What is claimed as new and is secured by Letters Patent is:

1. A pigment composition consisting of an intimate mixture of:
   75–95 wt. % based on the whole pigment composition of an organic pigment, and
   5–25 wt. % based on the whole pigment composition of a polymer made up of 0–40 wt. % of styrene, 20–70 wt. % of a methacrylic ester and 20–50 wt. % of methacrylic acid, wherein the total proportion of styrene, methacrylic ester and methacrylic acid is at least 85 wt. % of the entire monomers.

2. The pigment composition as claimed in claim 1, wherein the methacrylic ester is a mixture of a first methacrylic ester and a second methacrylic acid, the second methacrylic acid is the methacrylic acid ester of an aliphatic alcohol having at least 6 carbon atoms, the proportions of styrene, the first and second methacrylic esters and methacrylic acid are 10–30 wt. %, 10–55 wt. %, 10–30 wt. % and 25–50 wt. % respectively, and the total proportion of styrene, the first and second methacrylic ester and methacrylic acid is at least 90 wt. % of the entire monomers.

3. The pigment composition as claimed in claim 2, wherein the first methacrylic acid is a lower alkyl ester of methacrylic acid.

4. The pigment composition as claimed in claim 3, wherein the lower alkyl ester of methacrylic acid is methyl methacrylate.

5. The pigment composition as claimed in claim 2, wherein the second methacrylic acid is 2-ethylhexyl methacrylate or lauryl methacrylate.

6. The pigment composition as claimed in claim 1, wherein the molecular weight of the polymer ranges from 5,000–100,000.

7. The pigment composition as claimed in claim 1, wherein the content of the organic pigment ranges from 80–90 wt. % based on the whole pigment composition.

8. The pigment composition as claimed in claim 1, wherein the glass transition point of the polymer is at least 100° C.

9. The pigment composition as claimed in claim 1, wherein the pigment composition is in a powdery or particulate form.

10. A process for preparing a pigment composition by mixing 75–95 wt. %, based on the whole pigment composition, of an organic pigment with an aqueous solution containing 25–5 wt. %, based on the whole pigment composition, of a polymer to form an aqueous dispersion and then subjecting the organic pigment and polymer to coprecipitation, characterized in that monomers which form the polymer include 0–40wt. % of styrene, 20–70 wt. % of a methacrylic ester and 20–50 wt. % of methacrylic acid, and the total proportion of styrene, the methacrylic ester and methacrylic acid is at least 85 wt. % of the entire monomers, and the aqueous solution is an aqueous alkaline solution of an alkali metal salt, an alkali metal hydroxide, a lower amine or ammonium.

11. The process as claimed in claim 10, wherein the aqueous solution is an aqueous alkaline solution of ammonia or diethanolamine.

12. The process as claimed in claim 10, wherein the coprecipitation is effected by lowering the pH of the aqueous dispersion beyond pH 7.0 with an organic acid.

13. The process as claimed in claim 12, wherein the organic acid is acetic acid.

14. The process as claimed in claim 12, wherein the pH of the aqueous dispersion is lowered to 3–4.5.

15. The process as claimed in claim 10, wherein the aqueous solution contains the polymer at a concentration of 3–10 wt. %.

16. The process as claimed in claim 10, wherein the pigment composition is dried at a temperature of 90°–120° C. for 4–24 hours to obtain same in a powdery or particulate form.

* * * * *